(No Model.) 2 Sheets—Sheet 2.

T. W. B. MUMFORD & R. MOODIE.
SEPARATING MACHINE.

No. 321,379. Patented June 30, 1885.

Witnesses
William F. Davee
Henry Bossert

Inventors,
T. W. B. Mumford
R. Moodie
by their Attorneys,
Howson and Sons

UNITED STATES PATENT OFFICE.

THOMAS WILLIAM BASSETT MUMFORD AND ROBERT MOODIE, OF VICTORIA DOCKS, COUNTY OF ESSEX, ENGLAND.

SEPARATING-MACHINE.

SPECIFICATION forming part of Letters Patent No. 321,379, dated June 30, 1885.

Application filed March 18, 1885. (No model.) Patented in England February 2, 1885, No. 1,455.

*To all whom it may concern:*

Be it known that we, THOMAS WILLIAM BASSETT MUMFORD and ROBERT MOODIE, subjects of the Queen of Great Britain and Ireland, and manager and engineer, respectively, of Messieurs James Gibbs & Co., chemical manufacturers, residing at Victoria Docks, in the county of Essex, England, have jointly invented a certain Improved Separating-Machine, (for which we have made application for a patent in Great Britain, No. 1,455, dated 2d February, 1885,) of which the following is a specification.

Our invention consists of an improved machine for separating substances of different sizes or specific gravities, more especially adapted for separating the finer from the coarser particles of crushed or ground materials, such as grain and similar substances.

Figure 1:
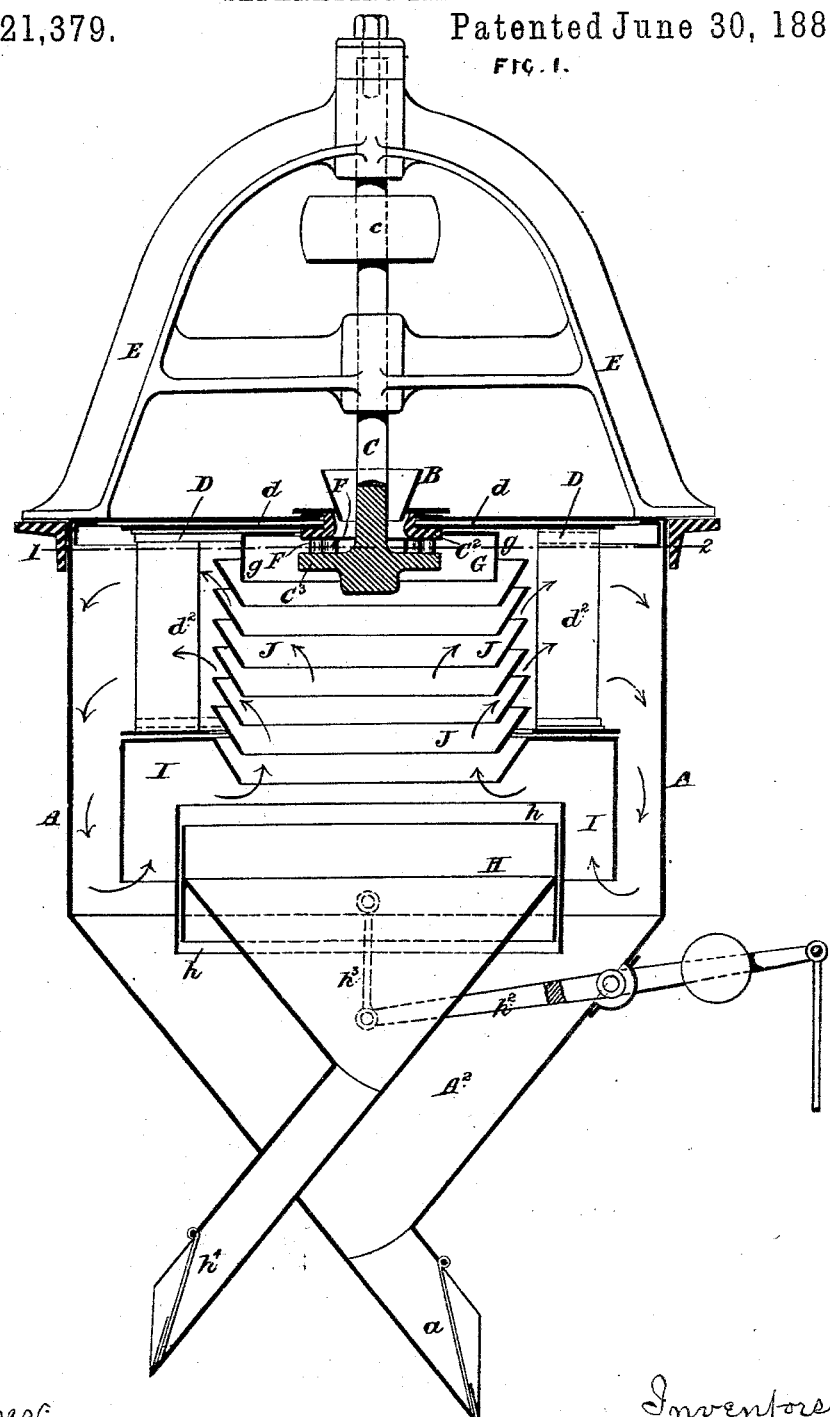
Figure 2:
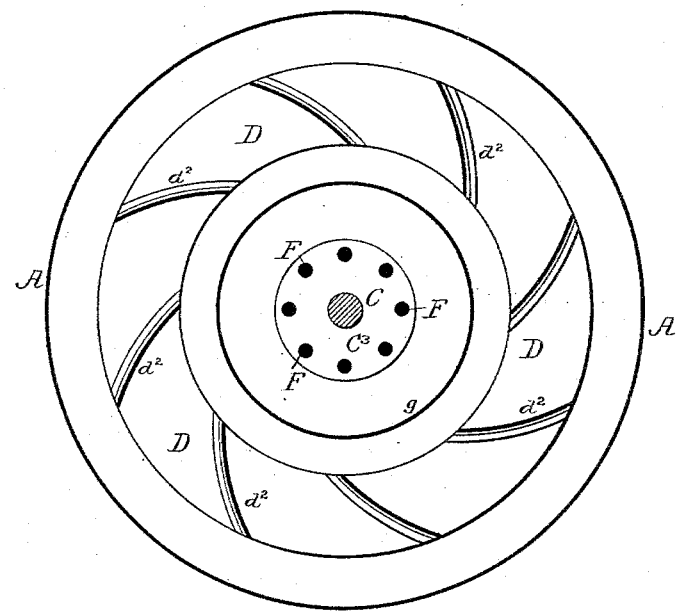
Figure 3:
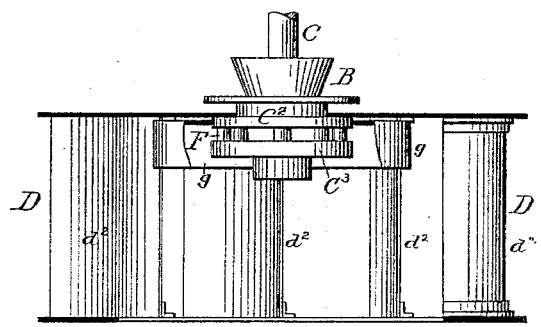

In the accompanying drawings, Figure 1 is a vertical section of our improved machine. Fig. 2 is a sectional plan view on the line 1 2, Fig. 1; and Fig. 3 is a detached view, partly in section, of the fan and parts connected with the fan-shaft.

A is a casing, having at its upper part a feed-hopper, B, through the center of which passes the vertical shaft C of the fan D. This fan is constructed in the present instance with a boss, $C^2$, carrying a disk, $d$, and vertical plates $d^2$. The shaft C is adapted to bearings in the frame E, carried by the casing A, and is provided with a pulley, $c$, by which it may be driven from any suitable motor. The lower part of the shaft is formed or provided with a flange or disk, $C^3$, below the lower opening of the hopper, and the fan D is secured to this disk $C^3$ through the medium of bars or pins F, forming a connection between the said disk $C^3$ and the boss $C^2$, but allowing a free passage between the two and between the bars for the material poured into the hopper, and thence into the interior of the machine. A hood or guard, G, having a depending rim, $g$, is fixed around the bars F, but at some little distance therefrom, so as to form a surface against which the material entering the casing impinges after it has passed between the bars F. Centrally below the fan D is a chute, H, surmounted by a hood, I, but leaving a passage between the hood and the upper part of the chute. Around the upper part of the chute is fitted an annular gate or casing, $h$, by which the size of the passage between the chute and hood can be varied by raising or lowering the gate, for a purpose described hereinafter. This gate may be controlled by a balanced lever, $h^2$, pivoted to the casing, or passing outside thereof and connected to the gate $h$ by links $h^3$.

The lower part of the chute H terminates in a suitable outlet provided with a valve, $h^4$, while the lower part of the casing A, around the chute H, forms a second chute, $A^2$, terminating in a spout provided with a valve, $a$.

Supported upon the top of the hood I, over the central opening therein, are louvers J, leaving spaces between them, as shown.

When the machine is in operation, the material to be separated is fed into the hopper B, and the fan D being rotated a continuous current or circulation of air is created within the casing of the machine through the louvers, down outside the hood I, and upward again between the hood I and the top of the chute H, as indicated by the arrows. The material under treatment falls from the hopper B and is projected through the spaces between the bars F against the rim of the guard G, and thence descends into the interior, where the currents of air strike it and carry the finer or lighter portions out through the spaces between the louvers, down outside the hood I into the outer chute, $A^2$, and leaving the machine through the spout at the bottom, while the heavier portions fall directly into the chute H and down through the discharge-spout of the latter.

By raising or lowering the annular gate $h$ the size of the passage between the hood I and the top of the chute H may be varied or regulated so as to vary the current, and consequently regulate the fineness or coarseness of the material separated.

Owing to the circulation of air being maintained entirely within the casing A, practically no dust is created in the room or place where the machine is situated.

We do not limit ourselves to the precise details and relative proportions of the parts shown in the drawings, as they may be considerably varied without departing from our invention. For example, a fan may be used inside of the contracted spaces between the louvers or their equivalents, the matter to be treated being fed at the outside of the fan.

The operation of the fan under the latter construction would be to blow the finer particles outside the descending stream of material under treatment, only the circulating current of air passing through the fan itself; whereas in the construction previously described the finer particles separated pass with the current of air between the blades of the fan.

We claim as our invention—

1. The combination of the casing having a supply-hopper and two discharge-chutes with louvers J and hood I, and a fan within the casing to maintain a closed circulation through the louvers to separate the substances, as set forth.

2. The combination of the casing having a supply-hopper, and the discharge-chute below the same, with a second discharge-chute, louvers J, the hood I, and a fan to maintain a circulation of air through the louvers and within the casing, substantially as and for the purpose set forth.

3. The combination of the casing having a supply-hopper and two discharge-chutes, one within the other, with a hood, I, louvers J, and a fan to maintain a circulation of air within the casing around the hood and between the louvers, substantially as specified.

4. The combination of the casing having a supply-hopper and two discharge-chutes with louvers J, and a hood, I, and a shaft, C, passing through the hopper and carrying the fan D, substantially as set forth.

5. The combination of the casing of a separating-machine with a shaft having a disk, $C^3$, bars F, and boss $C^2$, carrying a fan, and louvers within the casing, substantially as set forth.

6. The combination of the casing having a supply-hopper and two discharge-chutes with a fan, louvers, and a hood, I, and an annular adjustable gate, $h$, between the hood and one of the chutes, substantially as described.

In testimony whereof we have signed our names to this specification in the presence of two subscribing witnesses.

THOMAS WILLIAM BASSETT MUMFORD.
ROBERT MOODIE.

Witnesses:
CLAUDE WOODROW,
SAMUEL CRANSON,
*Both of* 31 *Lombard Street, London.*